United States Patent
Marand et al.

(10) Patent No.: US 7,931,838 B2
(45) Date of Patent: Apr. 26, 2011

(54) METHOD FOR MAKING ORIENTED SINGLE-WALLED CARBON NANOTUBE/POLYMER NANO-COMPOSITE MEMBRANES

(75) Inventors: Eva Marand, Blacksburg, VA (US); Sangil Kim, Tracy, CA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 591 days.

(21) Appl. No.: 11/847,585

(22) Filed: Aug. 30, 2007

(65) Prior Publication Data
US 2008/0290020 A1    Nov. 27, 2008

Related U.S. Application Data

(60) Provisional application No. 60/841,146, filed on Aug. 31, 2006, provisional application No. 60/847,933, filed on Sep. 29, 2006.

(51) Int. Cl.
  B29C 47/00    (2006.01)
  B29C 47/76    (2006.01)
  B01D 39/00    (2006.01)
(52) U.S. Cl. .......... 264/101; 264/41; 264/108; 427/244; 210/500.27; 210/500.41; 210/500.39; 210/500.29; 210/502.1; 977/755
(58) Field of Classification Search .............. 210/500.27, 210/490, 500.38, 500.41, 500.29, 500.36, 210/500.35, 660, 767; 423/443.1, 445, 443; 428/408, 99; 95/45–52; 96/11; 977/742, 977/755, 750; 429/129; 264/101, 108, 41; 427/244
See application file for complete search history.

(56) References Cited

U.S. PATENT DOCUMENTS

| | | | |
|---|---|---|---|
| 5,698,175 A * | 12/1997 | Hiura et al. ............... | 423/447.1 |
| 6,824,689 B2 * | 11/2004 | Wang et al. ............... | 210/660 |
| 6,858,197 B1 * | 2/2005 | Delzeit ..................... | 423/447.3 |
| 6,863,942 B2 * | 3/2005 | Ren et al. .................. | 428/36.9 |
| 7,205,069 B2 * | 4/2007 | Smalley et al. .............. | 429/129 |
| 7,459,121 B2 * | 12/2008 | Liang et al. ................ | 264/555 |
| 7,560,193 B2 * | 7/2009 | Ikuta et al. ................. | 429/246 |
| 2002/0159943 A1 | 10/2002 | Smalley et al. | |
| 2002/0173506 A1 * | 11/2002 | Clark et al. ................ | 514/224.2 |
| 2005/0040090 A1 | 2/2005 | Wang et al. | |
| 2006/0014084 A1 * | 1/2006 | French et al. ............... | 430/5 |
| 2006/0125033 A1 * | 6/2006 | Segal et al. ................ | 257/415 |
| 2006/0204427 A1 * | 9/2006 | Ghenciu et al. ........... | 423/445 B |

(Continued)

FOREIGN PATENT DOCUMENTS
WO    WO-9839250    9/1998

OTHER PUBLICATIONS

Bruce J. Hinds et al, Aligned Multiwalled Carbon Nanotubes Membranes; Jan. 2, 2004 vol. 303 Science www.sciencemag.org.*

(Continued)

*Primary Examiner* — Ana M Fortuna
(74) *Attorney, Agent, or Firm* — Blank Rome LLP

(57) ABSTRACT

Nano-composite membranes and methods for making them are described. The nano-composite membranes a made from a layer of oriented carbon nanotubes fixed in a polymeric matrix. Methods for efficient, facile, and inexpensive fabrication of the nano-composite membranes using a filtration method are also described. The carbon nanotubes may also be modified with chemical functional groups to promote their orientation in the carbon nanotube layer or to confer to them other properties.

12 Claims, 8 Drawing Sheets

U.S. PATENT DOCUMENTS

| | | | | |
|---|---|---|---|---|
| 2006/0250843 | A1* | 11/2006 | Bertin et al. | 365/185.08 |
| 2008/0223795 | A1* | 9/2008 | Bakajin et al. | 210/767 |
| 2009/0321355 | A1* | 12/2009 | Ratto et al. | 210/651 |
| 2010/0025330 | A1* | 2/2010 | Ratto et al. | 210/651 |

OTHER PUBLICATIONS

Hatton et al. "Past, Present, and Future of Periodic Mesoporous Organosilicas-The PMOs". Acc. Chem. Res. 2005, 38, pp. 305-312.
Hamon, et al. "Dissolution of Single-Walled Carbon Nanotubes". Advanced Materials, 1999, 11, No. 10, pp. 834-840.
Kuznetsova, et al. "Enhancement of adsorption inside of single-walled nantubes: opening the entry ports". Chemical Physics Letters 321 (2000), pp. 292-296.
Satyapal, et al. "Performance and Properties of a Solid Amine Sorbent for Carbon Dioxide Removal in Space Life Support Applications". Energy & Fuels 2001, 15, pp. 250-255.
Planeix, et al. "Application of Carbon Nanotubes as Supports in Heterogeneous Catalysis". J. Am. Chem. Soc. 1994, 116, pp. 7935-7936.
Chen, et al. "Rapid Diffusion of $CH_4/H_2$ Mixtures in Single-Walled Carbon Nanotubes". J. Am. Chem. Soc. 2004, 126, pp. 7778-7779.
Majumder, et al. "Effect of Tip Functionalization on Transport through Vertically Oriented Carbon Nanotube Membranes". J. Am. Chem. Soc. 2005, 127, pp. 9062-9070.
Wang, et al. "Molecular simulation of hydrogen adsorption in single-walled carbon nantubes and idealized carbon slit pores". Journal of Chemical Sciences, vol. 110, No. 1, Jan. 1, 1999, pp. 577-586.
Simonyan, et al. "Molecular simulation of hydrogen adsorption in charged single-walled carbon nanotubes". Journal of Chemical Physics, vol. 111, No. 21, Dec. 1, 1999, pp. 9778-9783.
Kuznetsova, et al. "Physical adsorption of xenon in open single walled carbon nanotubes: Observation of a quasi-one-dimensional confined Xe phase". Journal of Chemical Physics, vol. 112, No. 21, Jun. 1, 2000, pp. 9590-9598.
Challa, et al. "Adsorption and separation of hydrogen isotopes in carbon Multicomponent grand canonical Monte Carlo simulations". Journal of Chemical Physics, vol. 116, No. 2, Jan. 8, 2002, pp. 814-824.
Chen, et al. "Predictions of selectivity and flux for CH4/H2 separations using single walled carbon nanotubes as membranes". Jounral of Membrane Science, Elsevier, 2005, pp. 152-160.
Wang, et al. "Computer simulations of Hydrogran Adsorption on Graphite Nanofibers". The Journal of Physical Chemistry B, vol. 103, No. 2, Jan. 14, 1999, pp. 273-281.
Wang, et al. "Optimization of Carbon Nanotube Arrays for Hydrogen Adsorption". J. Phys. Chem. B 1999, 103, pp. 4809-4813.
Chen, et al. "Dissolution of Full-Length Single-Walled Carbon Nanotubes". J. Phys. Chem. B 2001, 105, pp. 2525-2528.
Chiang, et al. "Purification and Characterization of Single-Wall Carbon Nanotubes (SWNTs) Obtained from the Gas-Phase Decomposition of CO (HiPco Process)". J. Phys. Chem. B 2001, 105, pp. 8297-8301.
Chen, et al. "Examining the Accuracy of Ideal Adsorbed Solution Therapy without Curve-Fitting Using Transition Matrix Monte Carlo Simulations". Langmuir 2007, 23, pp. 6431-6437.
Hoagland. "Electrostatic Interactions of Rodlike Polyelectrolytes with Repulsive, Charged Surfaces". Macromolecules, American Cancer Society, 1990, 23, pp. 2781-2789.
Wang, et al. "Hydrogen adsorption on graphite and in carbon slit pores from path integral simulations". Molecular Physics, 1998, vol. 95, No. 2, pp. 299-309.
Ackerman, et al. "Diffusivities of Ar and Ne in Carbon Nanotubes". Molecular Simulation, vol. 29 (10-11), Oct.-Nov. 2003, pp. 677-684.
Islam, et al. "High Weight Fraction Surfactant Solubilization of Single-Wall Carbon Nanotubes in Water". Nano Letters, 2003, vol. 3, No. 2, pp. 269-273.
Calvert. "A recipe for strength". Macmillan Magazines Ltd., 1999, pp. 210-211.
Qin, et al. "The smallest carbon nanotube". Macmillan Magazines Ltd. 2000, pp. 50.
Wang, et al. "Single-walled 4A carbon nanotube arrays". Macmillan Magazines Ltd. 2000, pp. 51.
Majumder, et al. "Enhanced flow in carbon nanotubes". Nature, vol. 483, Nov. 2, 2005, pp. 44.
Subramaniam, et al. "Non-spherical bubbles". Nature, vol. 483, Nov. 2, 2005, pp. 45.
Challa, et al. "Light isotope separation in carbon nanotubes through quantum molecular sieving". Physical Review B., vol. 63, pp. 245419-1-245419-9.
Wang, et al. "Quantum Sieving in Carbon Nanotubes and Zeolites". Physical Review Letters, vol. 82, No. 5, Feb. 1, 1999, pp. 956-959.
Skoulidas, et al. "Rapid Transport of Gases in Carbob Nanotubes". Physical Review Letters, vol. 89, No. 18, Oct. 28, 2002, pp. 185901-1-185902-4.
Fan, et al. "Characterization of orientation state of carbon nanotubes in shear flow". Polymer 45 (2005) pp. 5232-5240.
Liu, et al. "Fullerene Pipes". Science, vol. 280, May 22, 1998, pp. 1253-1256.
Collins, et al. "Extreme Oxygen Sensitivity of Electronic Properties of Carbon Nanotubes." Science 287, 2000, pp. 1801-1804.
Kong, et al. "Nanotube Molecular Wires as Chemical Sensors". Science 287, 2000, pp. 622-625.
Hinds, et al. "Aligned Multiwalled Carbon Nanotubes Membranes". Science, vol. 303, Jan. 2, 2004, pp. 62-65.
Holt, et al. "Fast Mass Transport Through Sub-2-Nanometer Carbon Nanotubes". Science, vol. 312, May 19, 2006, pp. 1034-1037.
An et al. "Transformation of singlewalled carbon nanotubes to multiwalled carbon nanotubes and onion-like structures by nitric acid treatment." Synthetic Metals 140, 2004, pp. 1-8.
Li, et al. "Carbon Nanotube Film by Filtration as Cathode Catalyst Support for Proton-Exchange Membrane Fuel Cell". Langmuir 2005, pp. 9386-9389.
International Preliminary Report on Patentability (IPER), International Application No. PCT/US2007/077442, filed Aug. 31, 2007.

* cited by examiner

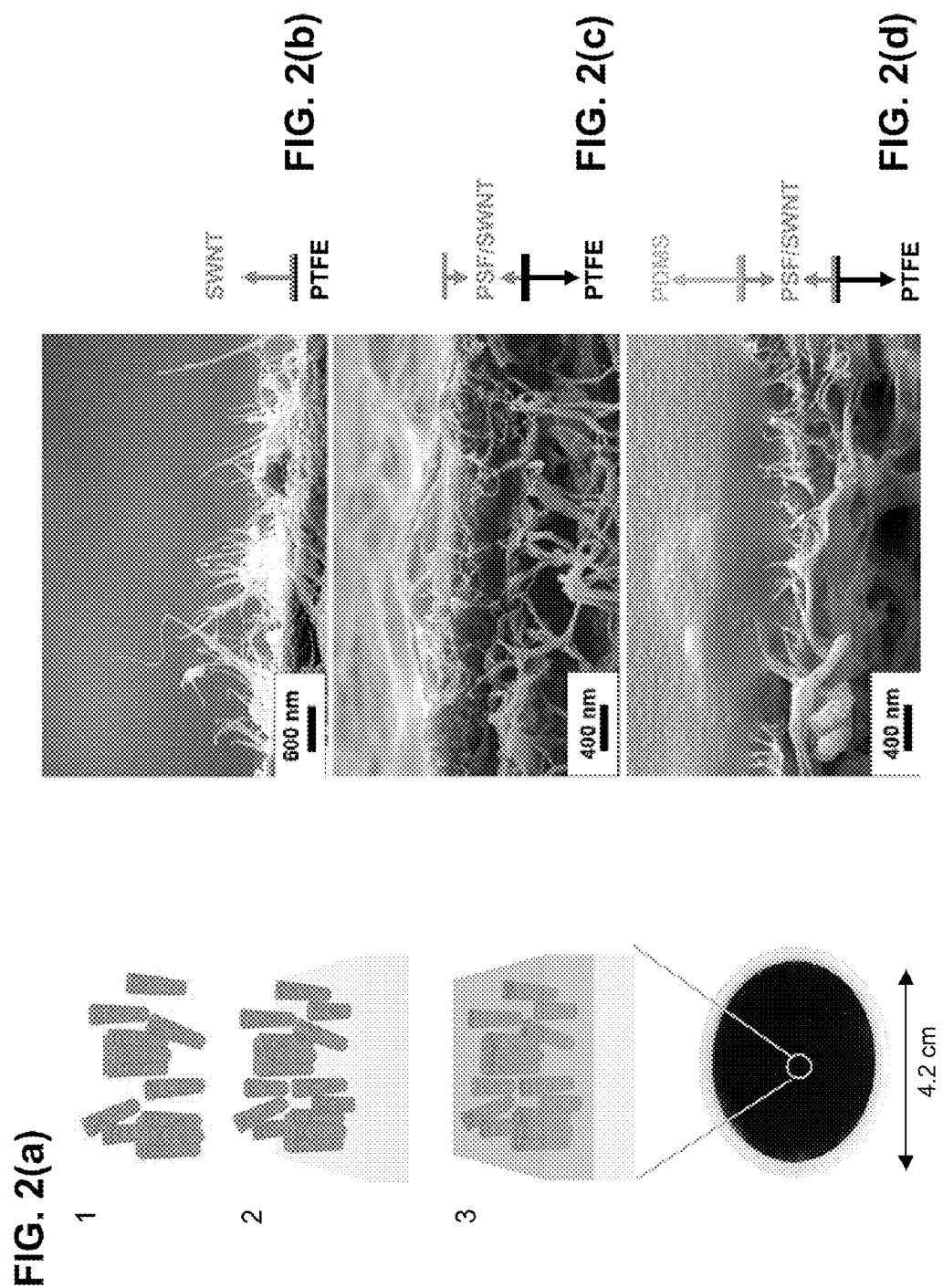

METHOD FOR MAKING ORIENTED SINGLE-WALLED CARBON NANOTUBE/POLYMER NANO-COMPOSITE MEMBRANES

STATEMENT OF PRIORITY

This application claims priority to U.S. Provisional Patent Applications Ser. No. 60/841,146, filed Aug. 31, 2006, and Ser. No. 60/847,933, filed Sep. 29, 2006, which are hereby incorporated by reference in their entirety.

GOVERNMENT INTEREST

The subject matter of this application was made with support from the United States Government under Grant No. CTS-0403692 from the National Science Foundation. The United States Government may retain certain rights in the invention.

FIELD OF THE INVENTION

The present invention is directed to nano-composite membranes and methods for making them. More specifically, the present invention is directed to nano-composite membranes with oriented single-walled carbon nanotubes and methods for making these membranes.

BACKGROUND OF THE INVENTION

Carbon nanotubes (CNTs) have been identified as fundamentally new nanoporous materials that show great potential for sensors,[1,2] composites,[3] catalytic supports,[4] and as membrane materials.[5,6] In particular, CNTs, which may have an inner core diameter as small as 4 Å[7,8] have been earmarked as possible selective nanopores in membrane materials.[9,10]

Previous studies by Hunt et al.[6] have shown that $Si_3N_4$ composite membranes with aligned double walled carbon nanotubes (DWNT) having a diameter of about 1.6 nm show gas flow through that is one to two orders of magnitude faster than that obtained with a commercial polycarbonate nanoporous membrane having 15 nm pore size. These studies have also found that liquid water flow through these nanotube membranes was more than three orders of magnitude faster than expected from hydrodynamic flow calculations. Moreover, these nanotube membranes exhibited extraordinarily high size exclusion selectivity. In related work, Hinds et al.[5] constructed polymer-nanotube composite membranes using multiwalled carbon nanotubes (MWNT) having large diameters (6-7 nm). Further study of these composite membranes verified that transport of liquids (alkanes, water) is orders of magnitude faster than can be accounted for by conventional hydrodynamic flow.[14]

Although composite membranes made with DMNTs and MWNTs have shown promising results, the use of single-walled nanotubes (SWNTs) for forming membranes is particularly intriguing. Recently, computer simulations have been used to investigate the adsorption,[30-34] selectivity,[35-37] and transport properties[9,10] of light gases in SWNTs. Johnson et al. have identified single walled carbon nanotubes as a fundamentally new nanoporous material that shows great potential for membrane materials.[9,10] That group reported transport rates in nanotubes to be orders of magnitude faster than in zeolites and demonstrated that the exceptionally high transport rates are a result of the inherent smoothness of the nanotubes.

In addition to allowing the fast transport rates afforded by all CNTs, SWNTs are smaller diameter carbon nanotubes with 4 to 12 Å pore openings in a size range that may allow for size-selection of gas mixtures. Recent computer simulation work by Sholl et al. has shown that SWNT membranes should be strongly selective for $CH_4$ over $H_2$ and should have flux/selectivity properties that far exceed those of any other known inorganic materials.[13]

In order for SWNTs to effectively act as channels in a membrane, however, they must to be aligned correctly relative to the penetrant stream. This alignment is perhaps the single most important challenge facing the fabrication of SWNT membranes.

Chemical vapor deposition has been used to grow oriented carbon nanotubes.[5,6] While chemical vapor deposition produces well-aligned carbon nanotubes, the process is expensive, tedious and is limited to fabricating samples with small surface areas (e.g. sub $cm^2$). In an alternative approach, CNTs have been aligned by employing filtration methods.[15,16] However, to date, filtration has been successful only with MWNTs.

As such, there remains a need in the art for a method for an facile, efficient and inexpensive manner for forming composite membranes with aligned CNTs, especially SWNTs.

SUMMARY OF THE INVENTION

It is an object of the present invention to provide composite membranes having a layer of oriented carbon nanotubes fixed in a polymer matrix. The composite membrane is configured to allow for the rapid transport of a permeate molecule or compound through the membrane. Further, the composite membranes may be configured to allow the transport of specific molecules or compounds while preventing others from being transported or slowing the transport of other molecules or compounds so that the membranes are capable of separating specific species from one another.

It is a further object of the present invention to provide a method for making a composite membrane having a layer of oriented carbon nanotubes that is facile, efficient and cost effective. The present invention provides methods for orienting carbon nanotubes by filtration. The methods provided by the present invention may be used with any type of carbon nanotube, including single-walled, double-walled and multi-walled carbon nanotubes.

It is a still further object of the present invention to provide a method for orienting carbon nanotubes by filtration where the carbon nanotubes have been modified to have chemical functional groups on their surfaces. The chemically modified carbon nanotubes have functional groups that facilitate better alignment of carbon nanotubes.

DESCRIPTION OF THE DRAWINGS

FIG. 2. CNT nanocomposite membrane process as described in Example 1. (a) Schematic membrane fabrication process. Step 1: The functionalized CNTs are dispersed in THF solution. Step 2: The CNTs/THF solution is filtered through 0.2 μm pore size hydrophobic polytetrafluoroethylene (PTFE) membrane filter. Step 3: The CNTs/PTFE is spin-coated with a dilute polymer solution. Some nanotube tips are embedded in polymer matrix. (b) Side-view SEM image of carbon nanotubes standing vertically on a membrane filter. (c) Side-view SEM image of aligned nanotube/PSF nanocomposite membrane after spin coating. Polymer coating is so thin that some carbon nanotube tips are exposed on top the surface. (d) Side-view SEM image of aligned nanotube/PSFPDMS composite membrane with a protective PDMS coating of 4 μm.

DETAILED DESCRIPTION OF THE INVENTION

Figure 1A:
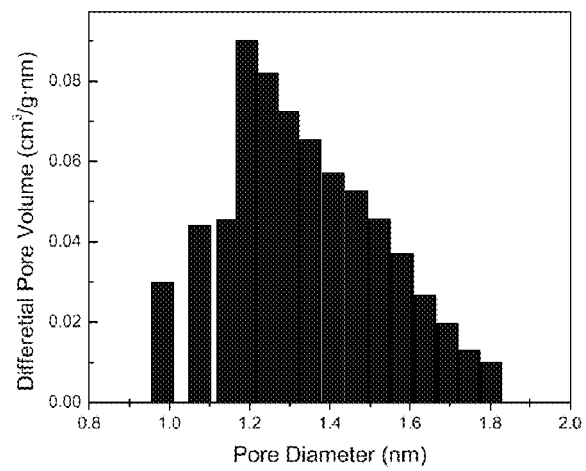
FIG. 1. SWNT pore structure of carbon nanotubes purified and modified as per Example 1. (a) Differential pore volume plot of SWNT at 77 K using $N_2$. Pore diameter of the SWNT sample was calculated by the Horvath-Kawazoe (H-K) method. The H-K method used here was derived for cylindrical pores. The distribution in micropore diameter of the SWNT ranges from 0.95 to 1.8 nm showing strong peak intensity at 1.2 nm. Therefore, the average pore diameter of the SWNT in this study is estimated to be 1.2 nm. (b) Zero-loss filtered (energy slit width of 10 eV) high resolution TEM (HRTEM) image of multiwalled CNT that is transformed from SWNTs after acid treatment. (c) Zero-loss HRTEM image of several SWNT bundles. CNT samples for high-resolution TEM experiments were prepared by utilizing dimethylformamide (DMF) as solvent to disperse them on an ultrathin amorphous carbon support film.

The present invention is directed to composite membranes having oriented carbon nanotubes (CNTs) and to facile methods for forming these membranes. In order for the composite membrane to be functional and efficient, a substantial proportion of the CNTs in the membrane should be oriented so that they are aligned parallel to the direction of the flow of the membrane penetrant.

The composite membranes of the present invention are formed from at least CNTs and a polymer matrix. The polymer matrix serves to provide structural support to the composite membrane and to maintain the orientation of the CNTs. Other layers or functionalities, such as other polymers or chemical modifying groups, can also be used to construct the composite membranes of the present invention, as will be described in further detail below.

In certain embodiments of the present invention, the carbon nanotubes (CNT) starting material used in forming the membranes of the present invention is made up of single-walled carbon nanotubes (SWNTs). Examples of SWNTs that may be used in embodiments of the invention include those synthesized using an electric-arc discharge method, such as SWNTs produced by Carbon Solutions, inc. of Riverside, Calif. or CarboLex, Inc. of Broomall, Pa. The SWNTs may also be synthesized using chemical vapor deposition[38] or high pressure CO disproportionation[39] methods known in the art. It is also contemplated that other types of CNTs may be used in embodiments of the present invention, such as multi-walled carbon nanotubes (MWNTs) and double-walled carbon nanotubes (DVWNTs).

It is preferable that the composite membranes of the present invention are made with CNTs having a diameter small enough to allow for size-selection in fluid mixtures, such as a gas mixture. The CNTs in the composite membrane will preferably have a diameter size and other properties that are appropriate for allowing a specific permeate molecule or compound in a fluid mixture to pass through the composite membrane while preventing other molecules or compounds from passing through the membrane. Preferably, the CNTs used in the composite membranes of the present invention have diameter sizes of about 0.8 nm to about 50 nm, although other diameter sizes are contemplated.

After CNT starting material is obtained, the CNTs may be treated by a multistage purification process, which may or may not involve cutting the CNTs into tubes of smaller length. This process may involve wet oxidation and/or acid treatment of the CNTs. Examples of such purification and cutting processes are known in the art, such as the processes described by Chiang et al.[40] and by Liu et al.[19].

After purification and/or cutting, the CNTs may then be modified with one or more chemical groups, as described. Chemically modified CNTs may have a variety of chemical functional groups attached to the CNT, including, but not limited to, carboxylic acid, amine, alkane, alkene, alkyne, alkoxy, ether, ester, cyano, silyl, sulfonic acid, phosphoric acid and boronic acid functional groups. These attached functional groups may then be further modified both covalently and non-covalently. In certain embodiments of the invention, the functional groups are formed as zwitterions on the surface of the CNTs. In one embodiment of the present invention, the zwitterion formed is a CNT-carboxylate octadecylammonium zwitterion, such as those described by Chen et al.[41]. The CNTs used in the present invention may be chemically modified to increase or decrease their solubility in specific solvents, or may be modified for other reasons.

After modification of CNTs, further purification and extraction methods may be necessary to purify the modified CNTs and to remove unreacted reagents. These purification and extraction methods may involve washing the CNTs in a suitable solvent, followed by filtration and drying steps to remove the solvent.

Once any optional purification and modification steps are performed, a dispersion of the CNTs may be made in a solvent or a surfactant. Use of various solvents or surfactants that allow for efficient dispersion and alignment of the CNTs is contemplated. If a solvent is used, various concentrations of the CNTs in the solvent are contemplated. In certain embodiments of the present invention, solvent concentrations of less than about $10 \times 10^{-5}\%$ wt of CNTs are contemplated, although the concentration may be higher. In certain embodiments of the invention, the solvent used for dispersion of the CNTs is chosen from tetrahydrofuran (THF) 1,4-dioxane, acetone, acetonitrile dimethylfornamide, dimethylsulfoxide, or the like. However, there may be other solvents more suitable for dispersion of the CNTs, depending on the type of chemical functional group that may be present on the CNT. For example, if a hydrophobic functional group has been added to the CNT, it may be more desirable to disperse the CNT in a non-polar solvent such as diethylether, hexane, benzene, toluene, chloroform, ethyl acetate, dichloromethane or the like.

If a surfactant is used, a variety of CNT: surfactant ratios may be used for dispersion and alignment of the CNTs. In certain embodiments, CNT: surfactant ratios of about 1:5 to about 1:15 are contemplated, although other values outside of this range may also be used. The surfactant may be any surfactant that allows for the desired dispersion of the CNTs. In certain embodiments of the present invention, the surfactant is sodium dodecylsulfonate, sodium dodecylbenzenesulfonate, ammonium lauryl sulfate, sodium laureth sulfate, alkyl benzene sulfonate, or the like.

The dispersed CNTs are then passed through a filter, causing a majority of the CNTs to form a layer in which they are oriented in a direction perpendicular to the filter, i.e. "standing up" on the filter.

A variety of filters may be used for orienting CNTs. The filters may be made of different polymeric materials and asymmetric membrane supports, including hydrophobic materials, such as polyfluoroethylene (PTFE) and polyvinylidene fluoride (PVDF), or hydrophilic materials, such as polypropylene, polyethersulfone (PES), and nylon. The type of filter may vary depending on the presence and type of chemical modifications on the CNTs to be filtered. The pore size of the filter used may also vary considerably. In certain embodiments of the present invention, the pore size is about 0.22 μm or smaller. However, other larger pore sizes, such as pore sizes of about 0.22 μm to about 1.0 μm are contemplated. Almost any pore size that is small enough to allow for retention of the majority of CNTs being filtered.

In certain embodiments of the present invention, if the CNTs are modified with hydrophilic functional groups, such as zwittenrons, then the filter may be made of a hydrophobic polymeric material. Without wishing to be bound by theory, it is thought that especially well aligned layers of CNTs can be obtained if the CNTs have hydrophilic chemical modifications and the filter is made of a hydrophobic material. As the hydrophobic filter tends to repel the hydrophilic modified groups of the CNTs, the hydrophilically modified CNTs will have a tendency to self-assemble into a well oriented layer. In other embodiments of the present invention, the properties of the CNTs and the filter may be reversed, i.e. the CNTs may be modified with hydrophobic functional groups and then filtered onto a hydrophilic filter.

After a layer of oriented CNTs is formed on the filter, the polymer matrix may be applied. The polymer matrix may be applied according to various techniques known to one of skill in the art.

The polymer matrix of the composite membranes of the present invention may be made from various polymeric compounds. In certain embodiments of the present invention, the polymeric matrix may be formed from a polyimide, a polysulfone, a poly(dimethysiloxane), a cellulose acetate, a polycarbonate, a polymethacrylate or another thermoplastic or glassy polymer. Examples of specific polymers which may be used include polysulfone (PSF) UDEL P-3500 from Solvay Advanced Polymers, L.L.C. of Alpharetta, Ga. and poly(dimethysiloxane) (PDMS) RTV615 from Momentive Performance Materials, Inc. of Wilton, Conn.

In certain embodiments of the present invention, the polymer matrix is applied using a spin-coating method. For applying the polymer matrix with a spin coating method, a solution of the polymer is prepared. Although other more concentrated solutions of polymer matrix may be used, it is preferred that the polymer solution is diluted to a concentration of less than about 10% by weight. The polymer solution may then be added dropwise onto the filtered, aligned CNTs and allowed to penetrate into the CNT layer. After the polymer solution is given time to penetrate, the CNTs may be spin coated for a sufficient period of time at a sufficient rotational speed, as is known in the art. In certain embodiments of the present invention, the CNTs may be spin coated for about 5-20 seconds at rotational speeds of about 1000 to about 2000 rpm. The spin coated CNTs are then allowed to dry until they reach sufficient dryness, for example, the spin coated CNTs may be allowed to dry for one day at room temperature.

In other embodiments of the present invention, the polymer matrix is applied by spraying a polymer solution, having a concentration similar to the one described above, onto a glass plate. The oriented CNTs may then be transferred onto the glass plate by pressing the CNT side of the filter onto the layer of the polymer solution on the glass plate. The coated CNTs are then allowed to dry until they reach sufficient dryness, for example, the spin coated CNTs may be allowed to dry for one day at room temperature.

Regardless of the method used to form the oriented CNT—polymeric matrix composite membrane, the membranes may then be placed under vacuum and heated to the glass transition temperature of the polymer which composes the polymer matrix for an amount of time sufficient to anneal the membrane. For example, if PSF is used for forming the polymer matrix, the membranes may be placed under vacuum and heated to about 458 K for a period of approximately 1 hour.

After the composite membranes are formed they may be used as is or further modified. In certain embodiments of the invention, the filter membrane used for alignment of the CNTs may be removed from the composite membranes. In other embodiments, additional layers of membranes or polymers may be added to confer additional properties to the composite membranes. For example, additional layers may be added to the composite membranes in order to modify their permeability. It is further contemplated that, in certain embodiments, chemical modifications may be made to either the CNTs or the polymeric matrix.

The composite membranes of the present invention are preferably used for highly efficient separation of permeate molecules or compounds in a fluid stream. In certain embodiments of the invention, the permeability of the membrane is due almost exclusively to the flow of fluid through the CNTs. However, it is also contemplated that specific polymer matrices that are at least slightly permeable to specific permeate molecules or compounds may also be used.

The composite membranes of the present invention are meant to be highly permeable to specific fluids and exhibit high flux for specific fluids. Preferably, the composite membranes of the present invention show flux and permeability for specific fluids that is greater than that described by the Knudsen flow model[21]. Further, non-limiting, descriptions of some of the desired properties for the composite membranes of the present invention are set forth in the Examples below.

It is contemplated that the composite membranes may have a number of uses beyond general separation of permeate molecules or compounds. Such uses include, but are not limited to use in respirators, use for desalinization, use as delivery channels for drug delivery, use in chemical sensing apparatuses, use for protein purification, and use in the separation of mixed gases.

In their use in respirators, the composite membranes of the present invention may be specifically constructed to allow the free exchange of air and $CO_2$, while preventing the transmission of infective agents (such as viruses and bacteria) through the membrane, thus allowing the wearer of the respirator to breathe freely in an environment where airborne infective agents are present.

In their use for desalinization, the composite membranes may be specifically constructed so as to allow water to pass freely through the composite membrane while retaining salt compounds.

In their use for drug delivery, the composite membranes may be used to construct drug delivery devices that allow for controlled delivery of specific therapeutic agents, including small molecule drugs, proteins and nucleic acids.

In their use in chemical sensing apparatuses, the composite membranes may only allow specific molecules or compounds to pass through to a detecting sensor, allowing for high specificity of chemical sensing.

In their use for protein purification, the composite membranes may be specifically constructed to allow only a protein of interest to pass through the membrane, allowing the protein of interest to be substantially purified. Alternatively, the composite membranes may be specifically constructed so that they retain a protein of interest, which can later be eluted from the membrane in a substantially purified state.

In their use for separation of mixed gasses, the composite membranes may be specifically constructed so that specific molecules or compounds in gas mixture pass through the membrane at a different rate, allowing for the substantial separation of the molecules and compounds from one another. Alternatively, for mixed gas separation, the composite membranes may be constructed so that a specific molecule or compound in a gas mixture may pass through the membrane while other compounds are not able to pass the membrane. Also alternatively for mixed gas separation, the composite membranes may be constructed so that a specific molecule or compound in a gas mixture is reversibly retained by the membrane. After retention by the membrane, the specific molecule or compound can then be released from the membrane and collected in substantially purified form.

In all potential uses of the composite membranes of the present invention, variations may be made in CNT pore size, CNT chemical modifications, and the polymer matrix which will allow for the specificity needed for the specific application.

The description of the present invention set forth herein, including the Examples set forth below, is meant to provide non-limiting description of the compositions and methods of the present invention. It should be apparent that there are variations of the present invention not explicitly presented in this specification that fall within the scope and the spirit of the invention as claimed.

EXAMPLES

Example 1

Preparation of Composite Membranes by Spin Coating

The transport properties of SWNT/polymer nano-composite membranes fabricated by orienting functionalized SWNT with a filtration method are described herein. It is believed that the alignment of the SWNT results from a self-assembly mechanism directed by the shear forces of the flowing solvent stream in combination with repulsive forces between the carbon nanotubes and the nearby membrane filter surface. It has been reported that shear forces align SWNTs in the flow direction.[17] The SWNTs samples orient in shear flow and propagate their perpendicular alignment to the filter substrate via long range repulsive forces that exist between the zwitterions attached to the carbon nanotube surface. This phenomena is similar to the orientation behaviour of rigid rodlike polyelectrolytes near charged surfaces.[18]

A. Preparation of CNTs

Methods

Electric arc-discharged SWNTs were purchased from Carbon Solutions, Inc. (Riverside, Calif.). Raw carbon nanotube materials were treated by multistage purification (a combination of wet-oxidation and acid treatments) to purify SWNTs from impurities and cut into small length with 3:1 mixture of concentrated $H_2SO_4$ (98 vol %):$HNO_3$ (70% vol %) solution. The details of the purification and cutting method are described elsewhere.[19,40] To produce soluble CNTs, an octadecylammonium (ODA) and SWNT-Carboxylate zwitterions were formed as described.[41,42] Shortened CNTs were heated with ODA at 393 K for 96 hours. After cooling to room temperature, the black-colored ODA and CNT mixture was washed with tetrahydrofuran (THF) and filtered through a membrane filter (0.2 μm). Because unreacted ODA was expected to block the entrance to the channels of SWNTs, ODA was further removed by Soxhlet extraction in ethanol at 393 K for 10 days.

Results and Discussion

Figure 1B:
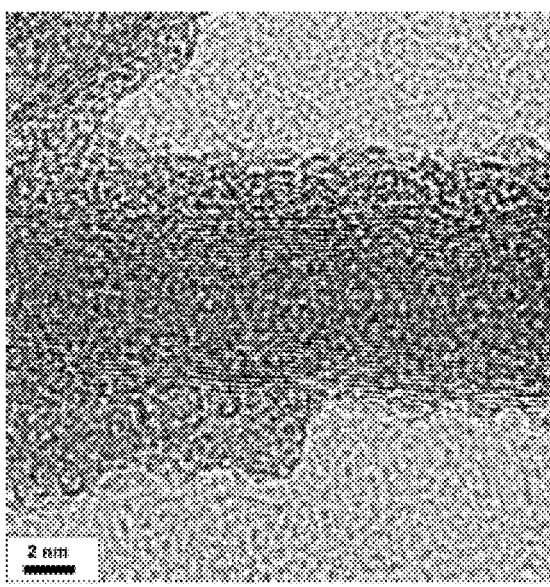
Figure 1C:
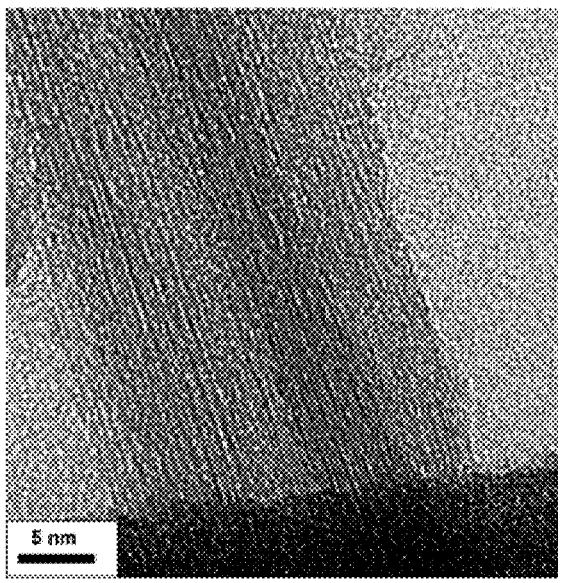

Arc discharge SWNTs were treated using a mixture of $H_2SO_4/HNO_3$ to cut the nanotubes into small lengths and open end tips.[19] The average pore diameter of the SWNT estimated from porosimetry measurements is 1.2 nm. The pore-size distribution is shown in FIG. 1a. It has been reported that acids can be intercalated into SWNT bundles and disintegrate the tube walls into graphitic flakes and then reform them into MWNTs.[20] After acid treatment, the prepared CNTs samples are mostly composed of multiwalled carbon nanotubes, or transformed SWNTs created during the oxidation, shown in FIG. 1b and bundled SWNTs shown in FIG. 1c. The transformed SWNTs have pore diameters of less than 2 nm and are surrounded by multilayered graphitic shells and amorphous-like carbon materials (FIG. 1b).

B. Fabrication of Composite Membranes

Methods

Filtered and dried functionalized CNTs and were dispersed in tetrahydrofuran (THF) using ultra-sonication for 30 min. The dilute CNT/THF solution ($6.7 \times 10^{-5}$ wt % of CNT) was then filtered through a 0.2 µm pore-size hydrophobic polytetrafluoroethylene (PTFE; Millipore) filter. Vertically-aligned CNTs remained on the filter support. This assembly was then dried at room temperature for 8 hours and subsequently coated with a thin PSF (UDEL P-3500, Solvay) or PDMS (RTV615, GE) layer using dilute <10 wt % polymer solution. Using a typical spin coating method, dilute polymer solution was poured dropwise onto the filtered CNT sample and waited for 1 min to penetrate well into CNT layer followed by spin coating for 10 sec at 1500 rpm. The prepared nanocomposites were given 1 day to dry at room temperature. Once dry, the composite films were placed under vacuum and the temperature was raised to its glass transition temperature, 458 K for 1 hour and then cooled down to room temperature.

Results and Discussion

CNT nano-composite membranes are prepared by dispersing amine-functionalized carbon nanotubes in THF and filtering this solution through a PTFE filter. The oriented carbon nanotubes remaining on the filter are coated with a thin polysulfone (PSF) layer. Polysulfone was chosen as the matrix to impart the membrane with mechanical strength and to seal the structure. The schematic of this process along with an actual image of the membrane film are shown in FIG. 2a. FIG. 2b shows the scanning electron microcopy (SEM) images of the CNTs on top of a PTFE membrane filter. Most of the nanotubes are "standing up", although some are not fully aligned vertically to the membrane filter. An SEM image of the composite film in FIG. 2c shows that spin-coating the polymer from a dilute solution allows the polymer to penetrate well around the nanotubes and allows most nanotube tips to be slightly exposed above the polymer matrix. The thickness of the carbon nanotube/polymer layer is about 600 nm. Nanocomposite membrane with an additional polydimethylsiloxane (PDMS) coating on top of the original carbon nanotubes/PSF system has also been prepared. This structure is shown in FIG. 2d.

C. High Resolution TEM Imagining of Composite Membranes

Methods

CNT/polymer nanoporous membrane samples for high-resolution TEM experiments in cross-sectional orientation were prepared by an ultramicrotoming method. After embedding the membrane in a resin, slices having a thickness less than 50 nm have been cut using a standard diamond microtome knife. The slices were placed onto a meshed copper TEM grid for support. Finally, the TEM specimen was coated with a thin amorphous carbon film prior to the TEM experiment to prevent specimen charging and to minimize beam damage. High-resolution TEM observations were made on a FEI Titan XT at 200 keV. The post-column Gatan Image Filter (GIF) has been utilized for zero-loss (ZL) filtered imaging with an energy slit width of 10 eV to improve image contrast and visibility of the graphene layers in CNTs by minimizing the blurring that is caused by inelastic scattering.

Results and Discussion

Figure 3A:
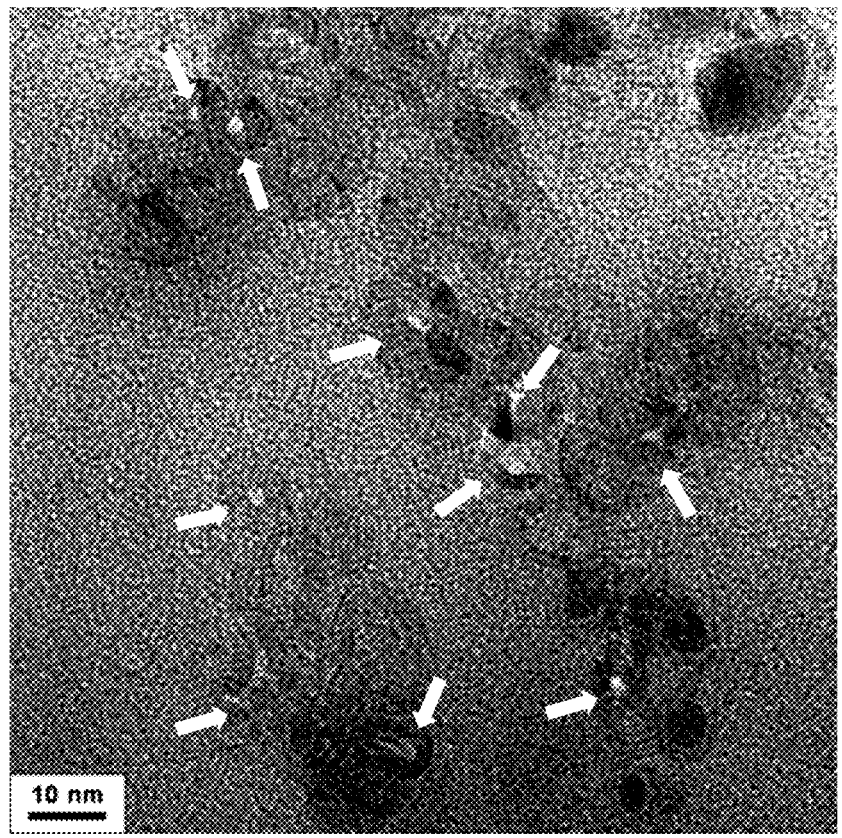
FIG. 3. HRTEM images in plan-view orientation of CNTs in a polymer matrix as fabricated in Example 1. The TEM specimen has been coated with a thin amorphous carbon film prior to the TEM experiment to prevent specimen charging. In (a) bright white spots (indicated by arrows) represent open nanotube pores. (b and c) HRTEM images at higher magnification reveal the structure of these pores. In (b) an encapsulated SWNT bundle is shown in the upper part of the image and an encapsulated individual SWNT is in the lower part of the image. This SWNT bundle has an inner diameter of 4 nm. (c) The individual SWNT with an inner diameter of ~1.5 nm is clearly encapsulated by additional graphite layers. The area density of SWNTs was measured to be ~$(7.0\pm1.75)\times10^{10}$/cm$^2$ from several HRTEM images.
Figure 3B:
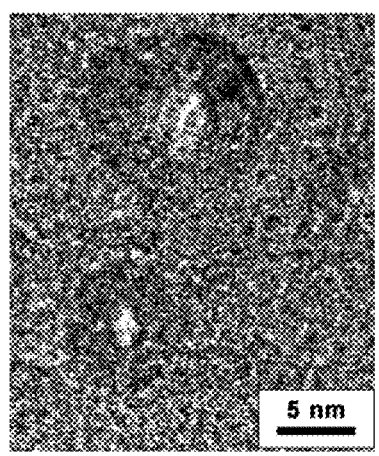
Figure 3C:
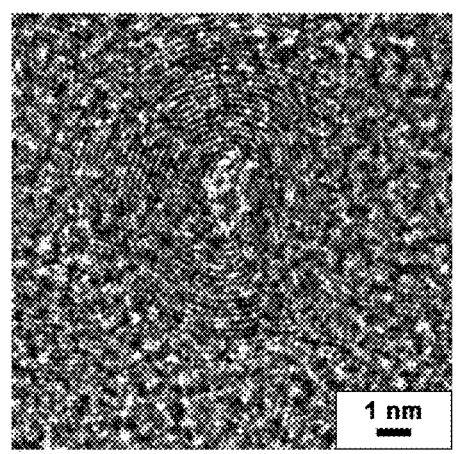

High-resolution transmission electron microcopy (HR-TEM) images of the CNT cross-sections in a polymer matrix are shown in FIG. 3a. These images have been used to estimate the area density of the carbon nanotubes, which is $\sim(7.0 \pm 1.75) \times 10^{10}$ nanotubes per $cm^2$. Similar to HRTEM images of the acid-treated CNTs sample in FIGS. 1b and 1c, HRTEM images of nanotubes in the polymer matrix reveal mostly two types of structures, namely encapsulated SWNT bundles and SWNTs with additional graphite sheets, as shown in FIG. 3b. A single SWNT which has been transformed into a MWNT by encapsulation with additional graphite layers is shown in FIG. 3c. It is likely that the increase in outer diameter of the transformed SWNT also aids in the vertical orientation of the carbon nanotube during the filtration process.

D. Characterization of Composite Membranes

Methods—Calculation of Knudsen Diffusion

The gas flow rate in Knudsen flow regime can be estimated from[43]

$$Q = \frac{2}{3}\sqrt{\frac{8\pi}{MRT}}\left(\frac{d}{2}\right)^3 V_m \frac{\Delta P}{L}\sigma A$$

where Q is the flow rate, M is molecular weight of penetrant, R is the universal gas constant, T is absolute temperature, d is the inner diameter of nanotube, $V_m$ is the molar volume, $\Delta P=4$ atm is the pressure difference between permeate and feed side, L=600 nm is the thickness of the membrane, $\sigma=\sim(7.0\pm1.75)\times10^{10}$ nanotubes/$cm^2$ is the area density, and A=13.85 $cm^2$ is the effective membrane area.

Results and Discussion

Figure 4A:
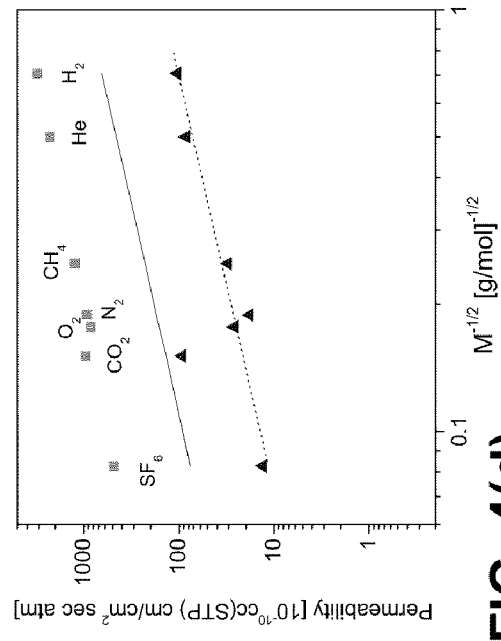
FIG. 4. Gas transport properties of CNT nanocomposite membranes fabricated as described in Example 1. Gas transport properties of CNT/PSF/PDMS membrane (triangle), CNTs/PSF membrane (square), and Knudsen diffusion model (solid line). (a) Effect of the pressure drop on the permeance of helium through CNTs/PSF membrane. (b) Single gas permeability as a function of the inverse square root of the molecular weight of the penetrant. (c) Single gas selectivity with respect to helium calculated from single gas permeability data. (d) Mixed gas selectivity ($CO_2/CH_4$) of CNTs/PSF membrane. The composition of gas mixture was $CO_2:CH_4$=50:50. The feed pressure was 50 psi and the pressure differential across membrane was maintained by drawing a vacuum on the permeate side. Operating temperature was maintained at 308 K.

The quality of the CNT/PSF composite membrane has been tested by measuring its permeation to helium. In general, the transport of pure gases through a porous membrane can be described by one of three mechanisms: viscous flow, Knudsen diffusion, and surface flow.[21] Knudsen diffusion occurs when the mean free path of the gas molecules ($\lambda$) is larger than the pore radius (r) of the membrane and there are more collisions with the pore walls than between gas molecules. When r/$\lambda$ becomes much larger than 1 (r>>$\lambda$), as would be the case for gas transport in pinholes and other structural defects, viscous flow dominates the gas transport mechanism. Therefore, high quality membranes can be characterized by the absence of viscous flow and more by Knudsen-like diffusion. For porous membranes which are governed by Knudsen diffusion, a plot of permeability versus average pressure should give a horizontal line because gas transport in a Knudsen regime is independent of the feed pressure. Alternatively, the permeation should increase with increasing pressure across the membrane when viscous flow takes place. As shown in FIG. 4a, the helium permeance through the CNT membranes is independent of the pressure drop across the membrane. This is evidence that there is no viscous flow through any large pinholes and that the prepared SWNT membrane is defect free.

Figure 4B:
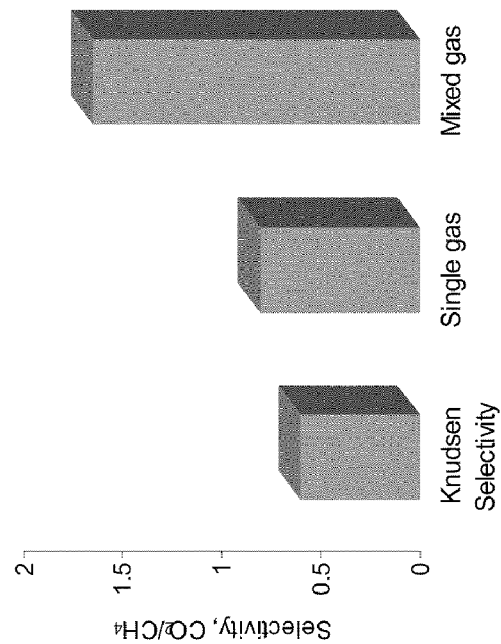

When Knudsen diffusion occurs, membrane permeance is inversely proportional to the square root of the molecular weight of the permeating gas molecule. FIG. 4b shows the effective gas permeability in the three oriented CNTs/polymer nanocomposite membranes as a function of the square root of the reciprocal of the gas molecular weight, $M^{-1/2}$. The solid line represents the Knudsen flow model. While the permeabilities of all samples are approximately proportional to $M^{-1/2}$, the absolute permeability of the CNTs/PSF membrane is significantly higher than that predicted by Knudsen diffusion. This indicates that the gas transport in this sample takes place primarily through the carbon nanotubes, with very little transport through the ultra-thin polymer matrix. This gas flow enhancement above the Knudsen regime is consistent with the atomistic simulations discussed previously[10] and the previous experimental observations of Holt et al.[6] On the other hand, the permeabilities of the sample having additional polymer coating, CNTs/PSF/PDMS, are lower than those predicted by the Knudsen diffusion model. This decrease in permeability is proportional to the transport resistance offered by the additional polymer layer. Some of the deviation of $CO_2$ permeance from the Knudsen scaling in this membrane is due the higher sorption of $CO_2$ in the PDMS layer relative to the other gases.[22]

Figure 4C:
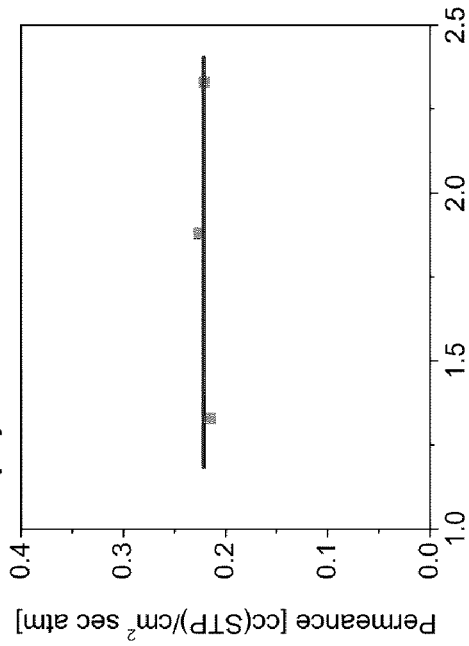
Figure 4D:
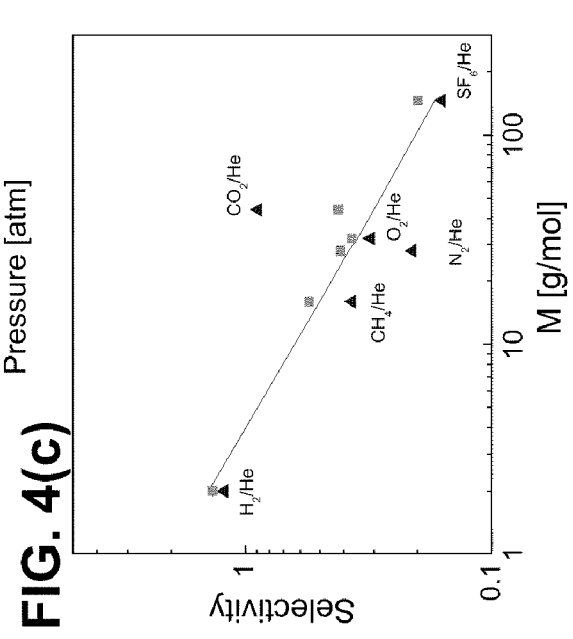

FIG. 4c shows the single gas selectivities for various gas/helium pairs of all three CNTs membranes as a function of the gas molecular weight. With the exception of $CO_2$, the selectivity exhibits the inverse-square-root of the molecular mass dependence predicted by the Knudsen diffusion model. Again, the higher-than Knudsen selectivity of the $CO_2$/He gas pair in the CNTs/PSF/PDMS membrane can be attributed to the high solubility of $CO_2$ in the PDMS layer. The permeation of gas mixtures through porous membranes provides a more stringent test of the transport mechanism than single gas experiments. If transport occurs via Knudsen diffusion, the selectivity observed from single gas experiments and mixed gas experiments would be identical. FIG. 4d compares the selectivities of one of our CNT/PSF membranes for $CO_2$/$CH_4$ as single gases and as permeation of a 50:50 feed mixture. The mixed gas selectivity is significantly different from the single gas experiments, so this example deviates strongly from Knudsen behavior.

Figure 5:
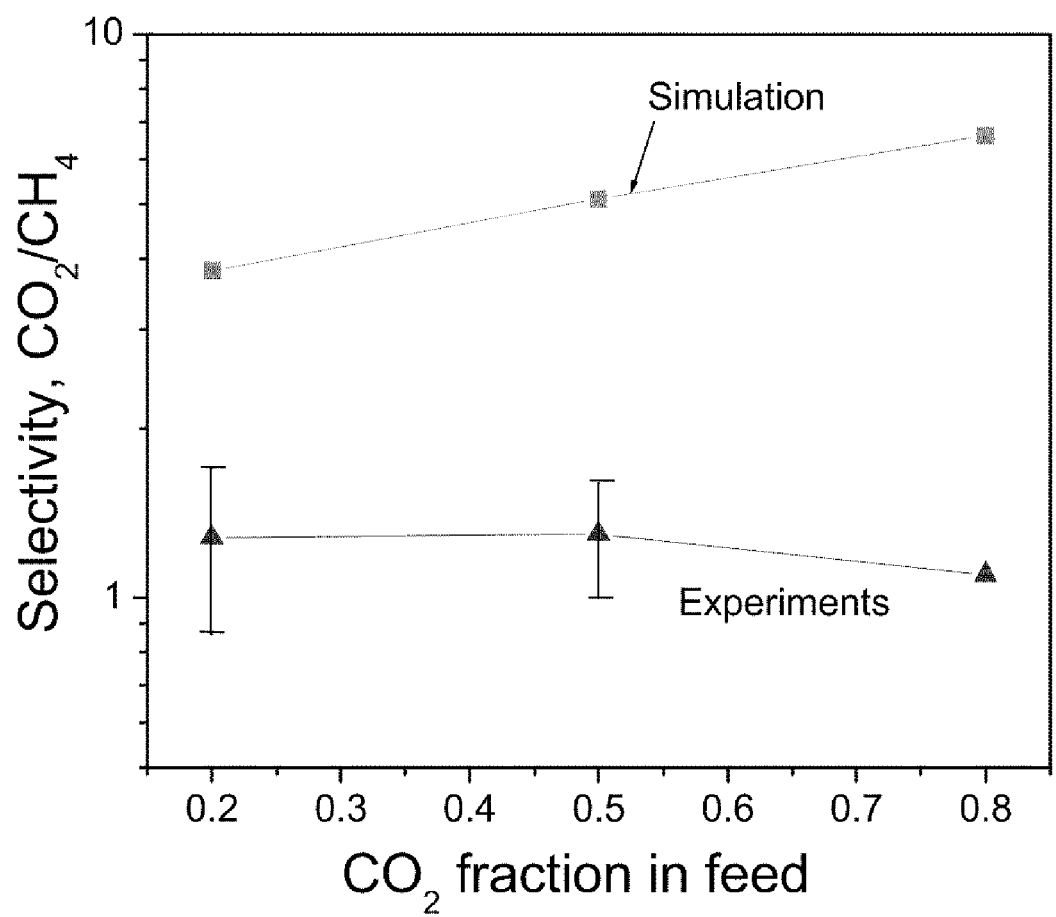
FIG. 5. Mixed gas selectivity ($CO_2/CH_4$) of CNTs/PSF membrane fabricated as in Example 1 at different $CO_2$ feed composition. Both experimental and simulation conditions assumed a feed pressure of 50 psi and a temperature of 308 K. The pressure differential across membrane was maintained by drawing a vacuum on the permeate side.

To further probe these mixture results, previous atomistic simulations were adapted to examine transport of $CO_2$/$CH_4$ mixtures in single CNTs. These simulations describe defect-free (10,10) nanotubes (diameter 1.36 nm) of infinite extent.[10, 11, 23] By separately computing adsorption isotherms and loading-dependent transport diffusion coefficients, predictions can be made for permeation through CNT membranes.[11, 13] Binary adsorption isotherms were predicted by applying Ideal Adsorbed Solution Theory (IAST) to the single-component isotherms from atomistic simulations. IAST is known to be accurate for these systems.[24] Binary transport diffusivities were predicted from the single-component diffusivities from atomistic simulations using the methods of Skoulidas, Sholl, and Krishna (SSK).[9] This method has been shown to be accurate for a range of similar systems via detailed atomistic simulations of mixture diffusion.[25] A broad range of feed pressures, compositions, and transmembrane pressure drops have been explored with these calculations; they predict $CO_2$/$CH_4$ selectivities varying between ~2-10, depending on operating conditions. For conditions similar to the performed experiments (50:50 feed. 50 psi feed, 0.7 psi permeate), our calculations predict a $CO_2$/$CH_4$ selectivity of 5.1. Experiments with a $CO_2$ mole fraction of 0.2, 0.5, and 0.8 in the membrane feed using three different nanocomposite membranes were also performed. The averaged experimental results along with the theoretical predictions are shown in FIG. 5. The error bars on the experimental data reflect the variability of the sample preparation method. The theoretical predictions give mixture selectivities that are considerably larger than the experimental observations. The predictions do, however, reproduce the non-Knudsen selectivity of the experiments. Briefly, the diffusion of isolated molecules in our simulations differs from Knudsen diffusion because both species adsorb on the walls of CNTs and individual collisions between molecules and the CNT walls do not completely thermalize the molecular momenta.[9, 11] In the mixture, the more strongly adsorbing $CO_2$ partially excludes $CH_4$ from CNTs and the slower diffusing $CO_2$ molecules reduce the mobility of adsorbed $CH_4$. Both of these effects increase the selectivity of the membrane relative to the result of single gas operation.[25]

There are three important caveats in comparing these atomistic calculations with the experimental data. First, the calculations are based solely on (10,10) CNTs. The importance of adsorption in larger CNTs is likely to be lower than in the relatively small pores of (10,10) CNTs. Diffusion coefficients for $CO_2$ from atomistic simulations are known to decrease as pore sizes increase,[23] but insufficient data is currently available to accurately predict the properties of permeating mixtures in these CNTs. Second, the calculations assumed that membrane transport is dominated by intra-pore diffusion. In short enough nanotubes, however, transport resistances associated with entering and leaving pores may also contribute. Estimates of these resistances for (10,10) nanotubes for $CH_4$ permeation indicate that they may not be negligible for CNTs of the lengths observed in our experiment (<1 µm).[26] Similar estimates are not available for $CO_2$ or for permeating mixtures, but related work on zeolites suggests that surface resistances should in general be more important for more strongly adsorbing molecules.[27] This would suggest that $CO_2$ transport through CNTs would be more strongly effected by pore entrance/exist effects than $CH_4$, potentially reducing the overall membrane selectivity. Third, the calculations assume the pore entrances of the CNTs are not functionalized. As stated above, the CNTs in our fabricated membranes are likely to be functionalized by zwitterions around pore mouths. Although the density of these functionalizing groups is not known, it is likely that they contribute to the overall performance of the membrane. In other studies, functional groups at the end of MWNTs have been utilized to investigate a "gatekeeper" mechanism for controlling the selectivity of chemical transport through the CNT membranes.[28] Amine functional groups have widely been used to modify sorbents and catalysts to increase $CO_2$ selectivity by carbamate formation in the absence of water.[29] It is therefore likely that the selectivity for $CO_2$-containing mixtures observed in the described membranes is due in part to the transport effects inside CNTs that were probed by our atomistic calculations are in part due to pore entrance/exit effects involving functionalization of the pore mouths.

E. Summary

In summary, the filtration method presented here facilitates the orientation of carbon nanotubes on porous supports and can be easily adapted to large-scale membrane formation. The resulting nanocomposite membranes have the same fast gas transport properties as those observed in carbon nanotube membranes grown by chemical vapor deposition. These results include the first characterization of gas mixture transport through CNT-based membranes. These results also indicate that it is possible to achieve rapid transport through CNT membranes that deviates from Knudsen selectivities.

Example 2

Preparation of Composite Membranes by Filter Inversion

A. Experimental and Characterization Method

Functionalization of Carbon Nanotubes

Electric arc-discharged single-walled carbon nanotubes (SWNTs) were purchased from Carbon Solutions, Inc. (Riverside, Calif.). Raw carbon nanotube materials produced by electric arc method were treated by multistage purification method (a combination of wet-oxidation and acid treatments) to purify CNTs from impurities and cut into small length with 3:1 mixture of concentrated $H_2SO_4$ (98 vol %):$HNO_3$ (70% vol %) solution. The details of the purification and cutting method are described elsewhere.[19,40,44,45] Nitrogen sorption isotherms at 77 K were carried out to characterize the pore structure. The pore size of CNTs was calculated using the Horvath-Kawazoe (H-K) model for cylindrical pores.[46] To produce soluble SWNTs, formed an octadecylammonium (ODA) and SWNT-Carboxylate zwitterions was formed by the following procedure.[41,42] Shortened SWNTs were heated with ODA at 393 K for 96 hours. After cooling to room temperature, the black-colored ODA and SWNTs mixture was washed with tetrahydrofuran (THF) and filtered through a membrane filter (0.2 μm). Because unreacted ODA were expected to block the entrance to the channels of SWNTs, ODA was further removed by Soxhlet extraction in ethanol at 393 K for 10 days.

Fabrication Oriented Carbon Nanotube Membranes

In order to form an oriented CNT on the membrane filter, the funtionalized CNTs were dispersed in THF solution by the ultra sonication. The well dispersed CNTs solution then filtered through 0.2 μm pore size hydrophobic polytetrafluoroethylene (PTFE) filter (Fluoropre membrane filter, Millipore). Because the CNTs were modified hydrophilic amine groups, the CNTs tend to stand up on the hydrophobic membrane filter and self-assemble into an oriented film. The prepared oriented CNTs on membrane filter were dried at room temperature for 1 day. In order to coat very thin polymer on CNTs, 5 wt % polysulfone (PSF) solution in chloroform was sprayed on glass plate and then the oriented CNTs film on PTFE filter was immediately transferred onto a glass plate by pressing the CNT-coated side of the filter onto the thin polymer solution. The metal disk was on the top of membrane filter side allowing for a PSF film with a uniform and thin thickness to avoid excess polymer layer without curling. The glass substrate was covered with a glass cover to slow the evaporation of solvent. The solutions were given 1 day to dry at room temperature. Once dry, the films were placed under vacuum and the temperature was raised to PSF glass transition temperature, 458 K for 1 hour and then cooled down to room temperature.

Characterization

FESEM (LEO 1550) was used to study the morphology of the membranes. Permeabilities of the polymeric and composite membranes were measured using a constant volume varying pressure apparatus. Permeability was measured directly, and the Time Lag Method was applied to the recorded data to determine the diffusivity coefficient. The solubility coefficient was taken as the ratio of the permeability to diffusivity coefficient. The gases used in this research were He, $CO_2$, $O_2$, $N_2$, and $CH_4$. Each gas possessed a purity of 99.99% and was used as received from Air Products. The feed pressure and temperature were kept constant at 4 atm and 308 K, respectively, for all experiments. Each gas was run through a membrane six times and the average results and the standard deviations were recorded.

B. Results and Discussions

Figure 6:
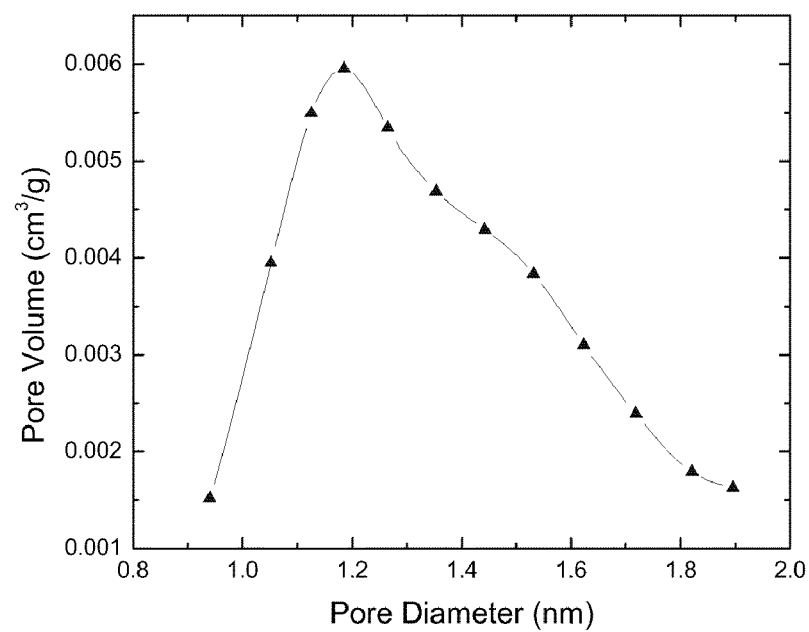
FIG. 6. Differential pore volume plot of SWNT prepared as described in Example 2 at 77 K using $N_2$. Pore diameter of the SWNT sample was calculated by the Horvath-Kawazoe (H-K) method. The H-K method used here was derived for cylindrical pores. The distribution in micropore diameter of the SWNT ranges from 0.95 to 1.9 nm showing strong peak intensity at 1.2 nm. Therefore, the average pore diameter of the SWNT in this study is estimated to be 1.2 nm.

Pore diameter of the SWNT sample was calculated by the Horvath-Kawazoe (H-K) method (FIG. 6). The H-K method used here was derived for cylindrical pores. The distribution in micropore diameter of the SWNT ranges from 0.95 to 1.9 nm showing strong peak intensity at 1.2 nm. Therefore, the average pore diameter of the SWNT in this study is estimated to be 1.2 nm.

Figure 7A:
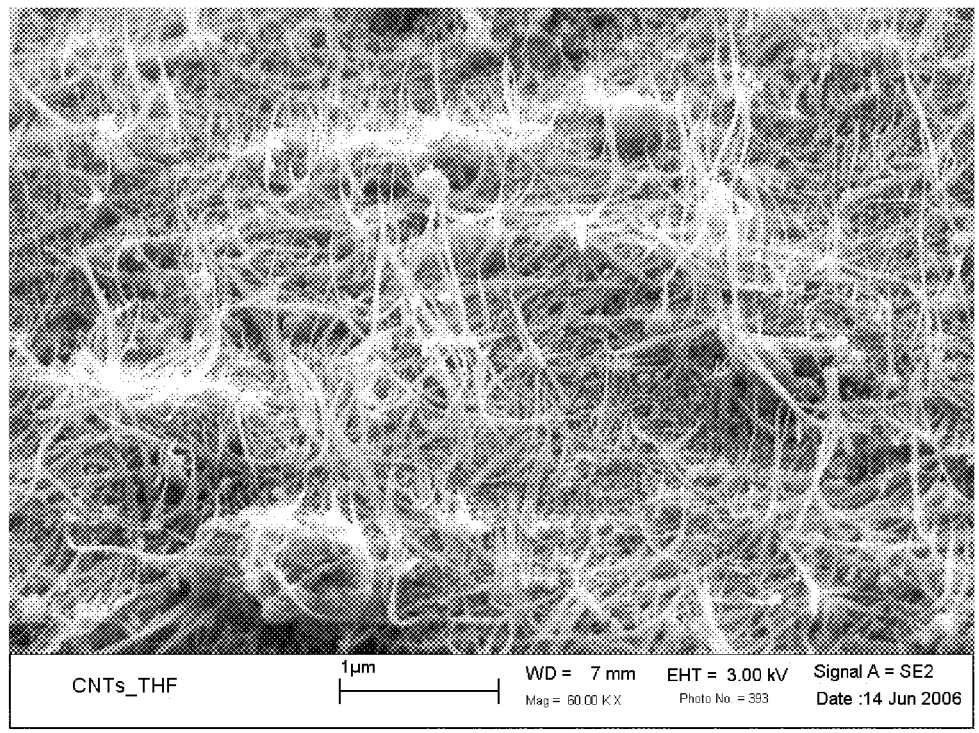
FIG. 7(a) shows the SEM images of the SWNT on a PTFE membrane filter, prepared as described in Example 2, with a thin nanotube layer of ca. 2 μm thickness. Most of the nanotubes are "standing up", although they are not fully oriented vertically to the membrane filter. After PSF coating, the SEM image of a composite film shows that the polymer is well penetrated through the nanotube layer without excess polymer coating on top of the SWNT (FIG. 7(b)).
Figure 7B:
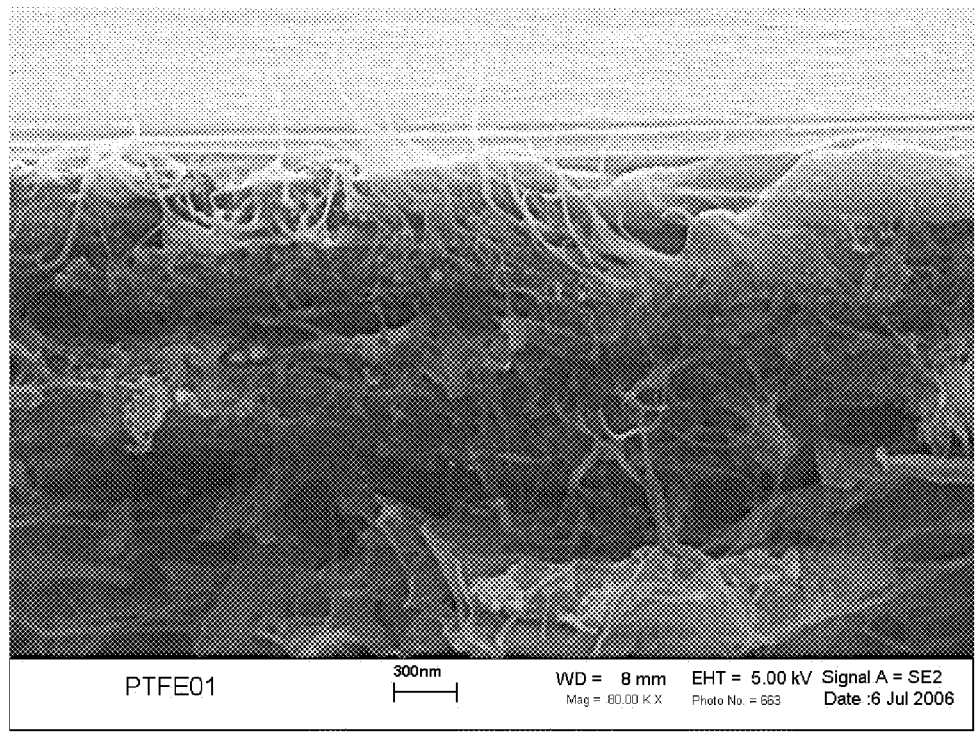
FIG. 7.

FIG. 7-(a) shows the SEM images of the SWNT on a PTFE membrane filter with a thin nanotube layer of ca. 2 μm thickness. Most of the nanotubes are "standing up", although they are not fully oriented vertically to the membrane filter. After PSF coating, the SEM image of a composite film shows that the polymer is well penetrated through the nanotube layer without excess polymer coating on top of the SWNT (FIG. 7(b)).

Figure 8:
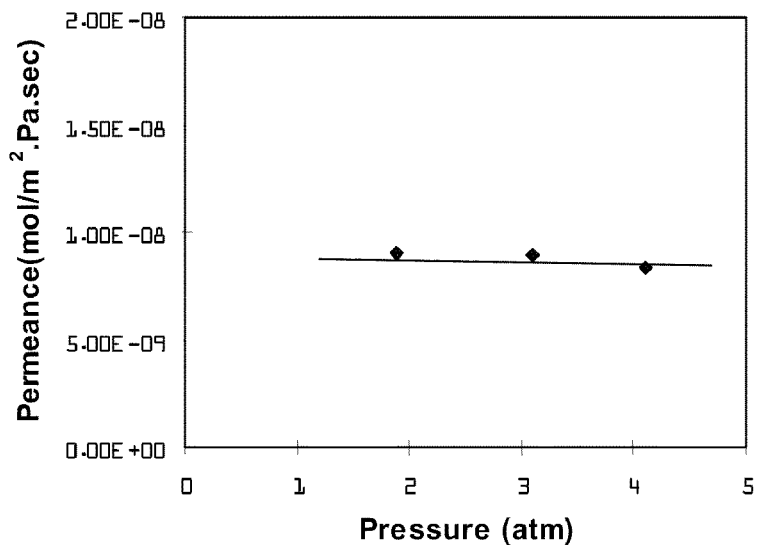
FIG. 8. The quality of the CNT/PSF composite membranes, produced as described in Example 2, was examined by the helium gas permeation studies. In general, the gas permeation mechanism through the mesopores (<5 nm) is governed by Knudsen diffusion when the surface diffusion and capillary condensation are absent. On the other hand, in relatively large pores (>5 nm), such as pinhole defects, molecular diffusion and viscous flow contribute to the gas transport. In single component measurements, molecular diffusion can be negligible because molecular diffusion is dominated by molecule-molecule collisions between two different gas species. Therefore, the quality of the membranes can be characterized by the absence of the contribution of viscous flow to the total transport as shown.

The quality of the CNT/PSF composite membranes was examined by the helium gas permeation studies. In general, the gas permeation mechanism through the mesopores (<5 nm) is governed by Knudsen diffusion when the surface diffusion and capillary condensation are absent. On the other hand, in relatively large pores (>5 nm), such as pinhole defects, molecular diffusion and viscous flow contribute to the gas transport. In single component measurements, molecular diffusion can be negligible because molecular diffusion is dominated by molecule-molecule collisions between two different gas species. Therefore, the quality of the membranes can be characterized by the absence of the contribution of viscous flow to the total transport as shown in FIG. 8. The permeance increases with increasing pressure across the membrane when viscous flow takes place, while the permeance in the case of Knudsen diffusion is not affected by the changes in pressure. The He permeances through the CNT membranes were independent of the pressure drop across the membrane. Therefore, the constant permeance with pressure in the nanotube membrane strongly suggest that there is no contribution of viscous flow resulted from large pinholes and the prepared SWNT membrane is defect free.

TABLE 1

Comparisons of experimental gas flow rates with Knudsen model[6]

| | Flux (cc/sec) | | | | |
|---|---|---|---|---|---|
| | He | $O_2$ | $N_2$ | $CH_4$ | $CO_2$ |
| CNT/PSF | $2.53 \times 10^{-2}$ | $8.92 \times 10^{-3}$ | $9.88 \times 10^{-3}$ | $1.39 \times 10^{-2}$ | $1.12 \times 10^{-2}$ |
| Knudsen flow model* | $5.17 \times 10^{-3}$ | $1.82 \times 10^{-3}$ | $1.95 \times 10^{-3}$ | $2.57 \times 10^{-3}$ | $1.55 \times 10^{-3}$ |
| Enhancement (%) | 389 | 390 | 406 | 441 | 623 |

$${}^*Q_{gas} = \frac{2}{3}\sqrt{\frac{8\pi}{MRT}}\left(\frac{d}{2}\right)^3 V_g \frac{\Delta P}{L}\sigma A \quad (1)$$

where, M=molecular weight
R=the gas constant
T=temperature=308 K
d=pore diameter=1.2 nm
$V_g$=the molar volume of gas=22434 cm$^3$/mol
$\Delta P$=the pressure drop=4 atm
L=membrane thickness=2 µm
σ=the areal pore density=2×10$^9$ CNTs/cm$^2$
A=the membrane area=3.273 cm$^2$ When the mean free path (λ) is larger than the channel dimensions (d) and particle surface collisions dominate over particle-particle collisions, the Knudsen diffusion model is frequently applied. The pore geometry of the SWNT membrane in our study is characterized by Knudsen numbers (λ/d>>1), but the flux measured in Table 1 exceeded the flux predicted by the Knudsen flow model. The gas flow enhancement is most likely caused by the intrinsic smoothness of the CNT surface as predicted by the atomistic simulation of gas flow through SWNTs.[9,10] The enhancements over the Knudsen model are much larger for $CH_4$ and $CO_2$ than He, $O_2$, and $N_2$, because CNTs have higher adsorption properties of CNTs for $CH_4$ and $CO_2$ resulting from amine pendent groups at the pore entrance.

TABLE 2

Gas permeation data of various membrane and predicted value by Knudsen model

| | Permeability (×10$^{-15}$ mol · m/m$^2$ · sec · Pa) | | | | |
|---|---|---|---|---|---|
| | He | $O_2$ | $N_2$ | $CH_4$ | $CO_2$ |
| PSF | 3.140 | 0.34 | 0.068 | 0.068 | 1.570 |
| 10 wt % randomly oriented SWNT/PSF | 3.780 | 0.45 | 0.074 | 0.103 | 1.910 |
| Oriented SWNT/PSF | 33.120 | 12.160 | 13.320 | 18.000 | 14.560 |
| Knudsen model | 3.490 | 1.230 | 1.320 | 1.730 | 1.050 |

Table 2 shows the permeability of oriented SWNT membrane compared with PSF, 10 wt % randomly oriented SWNTs/PSF mixed matrix membrane (MMM), and the Knudsen flow model for SWNTs membrane. For the disoriented SWNT/PSF MMM sample, the maximum loading occurs at 10 wt % SWNT because a maximum permeability reached and decreased for loading ≧15 wt %. As shown in Table 2, gas permeabilities of polymer increased with the addition of nanotube. The permeabilities through oriented SWNT membrane sample exceeded the permeabilities of PSF and disoriented SWNT/PSF sample by at least one to three orders of magnitude. In addition, the oriented nanotube membrane sample showed higher permeability than predicted by the Knudsen model by one order of magnitude.

TABLE 3

Gas selectivity of oriented SWNT membrane and Knudsen separation factor

| | $N_2/O_2$ | $CO_2/N_2$ | $CO_2/CH_4$ | $CH_4/He$ |
|---|---|---|---|---|
| Oriented SWNT/PSF | 1.10 | 1.09 | 0.81 | 0.54 |
| Knuden separation factor | 1.07 | 0.80 | 0.60 | 0.50 |

Figure 9:
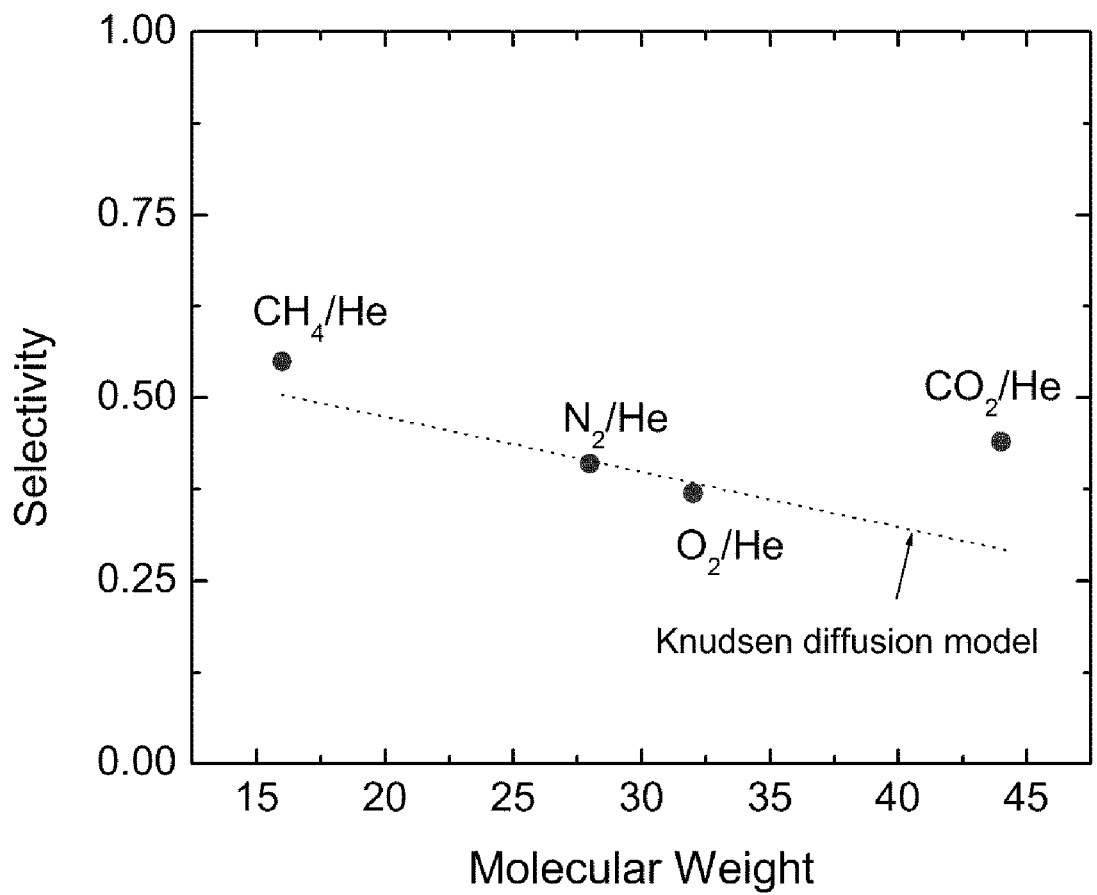
FIG. 9. Gas selectivities of an oriented SWNT membrane made as described in Example 2. For He, $O_2$, and $N_2$, the selectivity exhibited the inverse-square-root of the molecular mass by the Knudsen diffusion model. However, $CH_4$ and $CO_2$ deviated from the Knudsen separation factor showing a higher selectivity.

Table 3 and FIG. 9 show gas selectivities of an oriented SWNT membrane. For He, $O_2$, and $N_2$, the selectivity exhibited the inverse-square-root of the molecular mass by the Knudsen diffusion model. However, $CH_4$ and $CO_2$ deviated from the Knudsen separation factor showing a higher selectivity. These deviations can be explained by the preferential interaction of CNTs with $CH_4$ and $CO_2$. Gas adsorption of various gases on CNTs has shown strong adsorption of $CH_4$ and $CO_2$ over $H_2$, $O_2$, and $N_2$.[13] In addition, amine functional groups at the CNTs tips to disperse nanotubes in THF solution provide sites for $CO_2$ adsorption and enhance $CO_2$ selectivity.

C. Conclusion

This is the first report of the gas-transport properties of SWNT membranes using the functionalized SWNT and commercial polymer. A simple, fast, commercially attractive, and scalable filtration method to prepare an oriented CNT membrane with a large surface area has been demonstrated. The gas transport of the SWNT exceeded the permeabilities of PSF and disoriented SWNT/PSF sample by at least one to three orders of magnitude. In addition, the oriented nanotube membrane sample showed higher permeability than the predicted value by the Knudsen model by one order of magnitude. The SWNT membrane also shows higher selectivities of $CH_4$ and $CO_2$ over other gas molecules because of preferential interaction of $CH_4$ and $CO_2$ with the nanotubes demonstrating practical applications in gas separations.

Example 3

Method for Dispersing and Aligning CNTs Using Surfactant

A nanotube dispersion with a concentration of 0.01 mg/ml was mixed with surfactant (e.g. sodium dodecylsulfonate, sodium dodecylbenzenesulfonate).[47] The optimum CNT-surfactant ratio can be varied from 1:5 to 1:15. The suspension was sonicated for 2 days. The high concentration of the CNT suspension (20 ml)was diluted with deionized water (50 ml). The low concentration CNT suspension (10 ml) was filtered through membrane filter. The filter was rinsed several times to remove surfactant on the CNTs. The aligned CNTs were then dried at room temperature.

REFERENCES (1) Kong, J.; Franklin, N. R.; Zhou, C.; Chapline, M. G.; Peng, S.; Kyeongjae Cho; Dai, H. *Science* 2000, 28, 622-625.
(2) Collins, P. G.; Bradley, K.; Ishigami, M.; Zettl, A. *Science* 2000, 287, 1801-1804.
(3) Calvert, P. *Nature* 1999, 399, 210.
(4) Planeix, J. M.; Coustel, N.; Coq, B.; Brotons, V.; Kumbhar, P. S.; Dutartre, R.; Geneste, P.; Bernier, P.; Ajayan, P. M. *J. Am. Chem. Soc.* 1999, 116, 7935-7936.
(5) Hinds, B. J.; Chopra, N.; Rantell, T.; Andrews, R.; Gavalas, V.; Bachas, L. G. *Science* 2003, 303, 62-65.
(6) Holt, J. K.; Park, H. G.; Wang, Y.; Stadermann, M.; Artyukhin, A. B.; Grigoropoulos, C. P.; Noy, A.; Bakajin, O. *Science* 2006, 312, 1034-1037.
(7) Qin, L.-C.; Zhao, X.; Hirahara, K.; Miyamoto, Y.; Ando, Y.; Iijima, S. *Nature* 2000, 408, 50.
(8) Wang, N.; Tang, Z. K.; Li, G. D.; Chen, J. S. *Nature* 2000, 408, 50.
(9) Ackerman, D. M.; Skoulidas, A. I.; Sholl, D. S.; Johnson, J. K. *Mol. Simul.* 2003, 29, 677-684.
(10) Skoulidas, A. I.; Ackerman, D. M.; Johnson, J. K.; Sholl, D. S. *Phys. Rev. Lett.* 2002, 89, 185901-4.
(11) Chen, H.; Johnson, J. K.; Sholl, D. S. *J. Phys. Chem. B.* 2006, 110, 1971-1975.
(12) Chen, H.; Sholl, D. S. *J. Am. Chem. Soc.* 2004, 126, 7778-7779.
(13) Chen, H.; Sholl, D. S. *J. Membr. Sci.* 2006, 269, 152-160.

(14) Majumder, M.; Chopra, N.; Andrews, R.; Hinds, B. J. *Nature.* 2005, 438, 44.
(15) der Heer, W. A.; Bacsa, W. S.; Chatelain, A.; Gerfin, T.; Humphrey-Baker, R.; Forro, L.; Ugarte, D. *Science* 1995, 268, 845-847.
(16) Li, W.; Wang, X.; Chen, Z.; Waje, M.; Yan, Y. *Langmuir* 2005,21, 9386-9389.
(17) Fan, Z. H.; Advani, S. G. *Polymer* 2005, 46, 5232-5240.
(18) Hoagland, D. A. *Macromolecules* 1990, 23, 2781-2789.
(19) Liu, J.; Rinzier, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.; Lee, T. R.; Colbert, D. T.; Smalley, R. E. Fullerene pipes. *Science* 1998, 280, 1253-1256.
(20) An, K. H.; Jeon, K. K.; Moon, J.-M.; Eum, S. J.;Yang, C. W.; Park, G.-S.; Park, C. Y.; Lee,Y. H. *Syn. Met.* 2004, 140, 1-8.
(21) Uhlhorn, R. J. R.; Keizer, K.; Burggraff, A. J. *J. Membr. Sci.* 1989, 46, 225-241.
(22) Merkel, T. C.; Bondar, V. I.; Nagai, K.; Freeman, B. D.; Pinnau, I. *J. Polym. Sci. B: Polym. Phys.* 2000, 38, 415-434.
(23) Skoulidas, A. I.; Sholl, D. S.; Johnson, J. K. *J. Chem. Phys.* 2006, 124, 054708.
(24) Chen, H.; Sholl, D. S. *Langmuir* 2007, 23, 6431-6437.
(25) Sholl, D. S. *Acc. Chem. Res.* 2006, 39, 403-411.
(26) Newsome, D. A.; Sholl, D. S. *Nano Lett.* 2006, 6, 2150-2153.
(27) Newsome, D. A.; Sholl, D. S. *Micro. Meso. Mater.* 2007, in press.
(28) Majumder, M.; Chopra, N.; Hinds, B. J. *J. Am, Chem. Soc.* 2005, 127, 9062-9070.
(29) Satyapal, S.; Filburn, T.; Trela, J.; Strange, J. *Energy Fuels* 2001, 15, 250-255.
(30) Wang, Q.; Johnson, J. K. *Molecular Physics* 1998, 95, 299
(31) Wang, Q.; Johnson, J. K. *Journal of Chemical Physics* 1999, 110, 577.
(32) Wang, Q.; Johnson, J. K. *J. Phys. Chem. B* 1999, 103, 277.
(33) Wang, Q.; Johnson, J. K. *J. Phys. Chem. B* 1999, 103, 4809.
(34) Simonyan, V. V.; Diep, P.; Johnson, J. K. *Journal of Chemical Physics* 1999, 111, 9778.
(35) Wang, Q.; Challa, S. R.; Sholl, D. S.; Johnson, J. K. *Physical Review Letters* 1999, 82, 956-959
(36) Challa, S. R.; Sholl, D. S.; Johnson, J. K. *The Journal of Chemical Physics* 2002, 116, 814.
(37) Challa, S. R.; Sholl, D. S.; Johnson, J. K. *Physical Review B: Condensed Matter and Materials Physics* 2001, 63, 245419/1.
(38) Cheung, C. L.; Kurtz, A.; Park, H.; Lieber, C. *J. Phys. Chem. B* 2002, 106, 2429.
(39) Nikolaev, P.; Bronikowski, M. J.; Bradley, R. K.; Rohmund, F.; Colbert, D. T.; Smith, K. A.; Smalley, R. E. *Chem. Phys. Lett,* 1999, 313, 91.
(40) Chiang, I. W.; Brinson, B. E.; Huang, A. Y.; Willis, P. A.; Bronikowski, M. J.; Margrave, J. L.; Smalley, R. E.; Hauge, R. H. *J. Phys. Chem. B* 2001, 105, 8297.
(41) Chen, J.; Rao, A. M.; Lyuksyutov, S.; Itkis, M. E.; Hamon, M. A.; Hu, H.; Cohn, R. W.; Eklund, P. C.; Colbert, D. T.; Smalley, R. E.; Haddon, R. C. *Journal of Physical Chemistry.B* 2001, 105, 2525
(42) Hamon, M. A.; Chen, J.; Hu, H.; Chen, Y.; Itkis, M. E.; Rao, A. M.; Eklund, P. C.; Haddon, R. C. *Advanced Materials* 1999, 11, 834.
(43) Knudsen, M. *Methuen, London,* 1934.
(44) Kuznetsova, A.; Mawhinney, D. B.; Naumenko, V.; Jr., J. T. Y.; Liu, J.; Smalley, R. E. *Chemical Physics Letters* 2000, 321, 292.
(45) Kuznetsova, A.; J. T. Yates, J.; Liu, J.; Smalley, R. E. *Journal of Chemical Physics* 2000, 112, 9590.
(46) Saito, A.; Foley, H. C. *AIChE Journal* 1991, 37, 429.
(47) Islam, M. F.; Rojas, E.; Bergey, D. M.; Johnson, A. T.; Yodh, A. G. *Nano Lett,* 2003, 3 269.

What is claimed is:

1. A method of making a composite membrane comprising the steps of:
providing a dispersion of carbon nanotubes, wherein the dispersion comprises the carbon nanotubes at a concentration less than about $10 \times 10^{-5}\%$ (wt.) and a surfactant;
orienting the majority of the carbon nanotubes on and in a direction perpendicular to a filter by filtration alone, wherein the pore size of the filter is about 0.22 µm or smaller;
providing a polymer matrix comprising a polymer and a diluting solvent;
casting the polymer matrix onto the layer of oriented carbon nanotubes;
removing diluting solvent from the composite; and
annealing the polymer thereby forming a nano-composite membrane.

2. The method of making a composite membrane according to claim 1, wherein the carbon nanotubes are dispersed in a dispersing solvent.

3. The method of making a composite membrane according to claim 1, wherein the polymer matrix is cast using a spin coating method.

4. The method of making a composite membrane according to claim 1, wherein the polymer matrix is cast by layering the polymer diluted in the diluting solvent on a substrate and causing oriented carbon nanotubes to come in contact with the layer of diluted polymer.

5. The method of making a composite membrane according to claim 1, wherein the annealing step comprises placing the composite membrane in a vacuum and heating the composite membrane to at least about the glass transition temperature of the polymer being used to form the polymer matrix.

6. The method of making a composite membrane according to claim 1, wherein the oriented carbon nanotubes comprise oriented multi-walled, double-walled and single-walled carbon nanotubes.

7. The method of making a composite membrane according to claim 1, wherein the carbon nanotubes have diameters from about 0.8 nm to about 50 nm.

8. The method of making a composite membrane according to claim 1, wherein the oriented carbon nanotubes comprise carbon nanotubes which have been chemically modified with functional groups.

9. The method of making a composite membrane according to claim 8, wherein the chemical modifying groups are selected from the group consisting of:
carboxylic acid, amine, alkane, alkene, alkyne, alkoxy, ether, ester, cyano, silyl, sulfonic acid, phosphoric acid and boronic acid functional groups.

10. The method of making a composite membrane according to claim 8, wherein the chemical modifying group is a zwitterion.

11. The method of making a composite membrane as recited in claim 1, wherein said polymer matrix comprises a polymer selected from the group consisting of:
a polyimide; a polysulfone; a cellulose acetate; a polycarbonate; a polymethacrylate; other thermoplastic polymers and other glassy polymers.

12. The method of claim 1, wherein the carbon nanotube is hydrophilic and the filter is hydrophobic.

* * * * *